Dec. 22, 1942.  E. W. McKINLEY  2,305,975
FLUID PRESSURE REGULATOR
Filed March 4, 1940
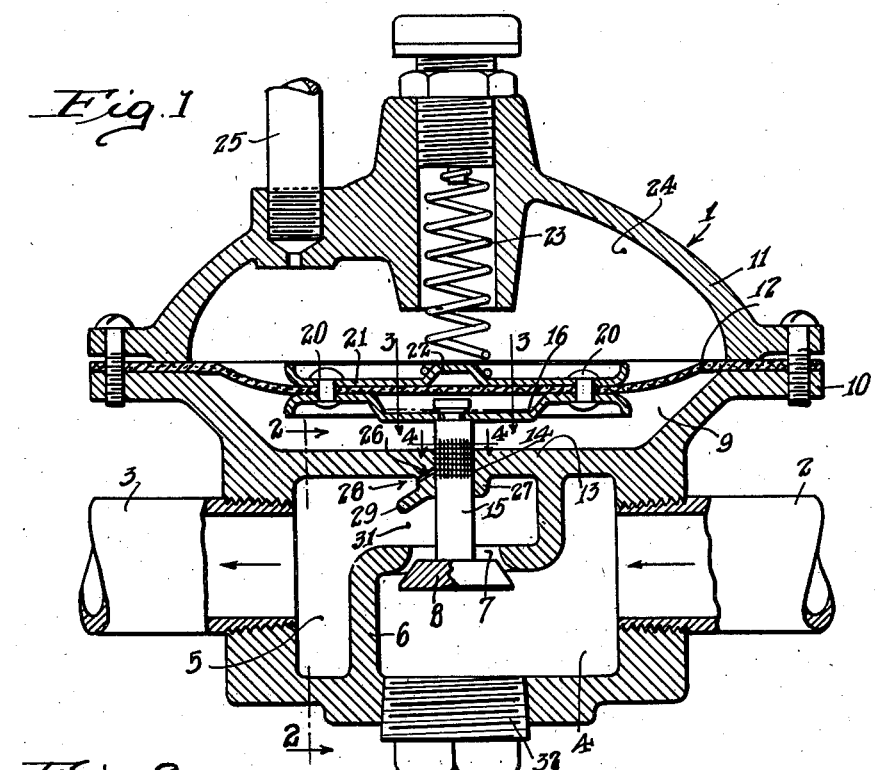
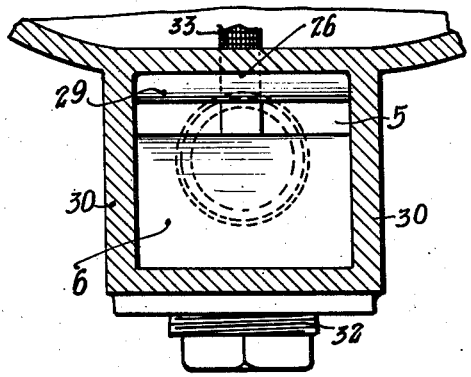
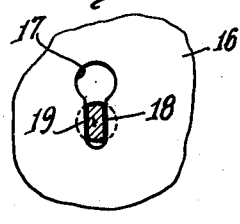
Inventor
Edwin W. McKinley
By Lyon & Lyon
Attorneys Patented Dec. 22, 1942

2,305,975

UNITED STATES PATENT OFFICE 2,305,975

FLUID PRESSURE REGULATOR

Edwin W. McKinley, Los Angeles, Calif.

Application March 4, 1940, Serial No. 322,135

6 Claims. (Cl. 50—23)

This invention relates to fluid pressure control appliances, for example, gas regulators of the type employed in service lines in maintaining a substantial constant supply of gas to a consumer under varying consumption conditions by the consumer's gas burning appliances. Such regulators usually include a valve connected to a movable member or diaphragm in the pressure chamber, the pressure in which is controlled by the rate of volume of flow of the gas passing through the device.

One of the objects of my invention is to provide a simple construction whereby a sensitive control of the valve will be maintained to regulate the amount of fluid such as gas, that will be supplied to the consumer, thereby adapting the supply to any changes in the immediate requirements of the consumer.

Another object of my invention is to provide a construction for the regulator, that will develop and maintain a nice control of the effective valve opening through the agency of the pressure in the pressure chamber, and to utilize means of communication already at hand in regulators of common construction for effecting the control of the pressure in the control chamber.

In the preferred embodiment of my invention, the casing of the device is provided with a passage through the same for the fluid in which the valve is placed; and one of the objects of my invention is to provide the outlet portion of this passage with a form particularly adapting it to cooperate with an eduction pocket formed therein for effecting changes in the pressure in the control chamber to control the valve.

In the preferred embodiment of the invention, the eduction port that communicates increases or decreases of pressure to the control chamber, leads off from the face of the valve stem guide opening, and emerges into the fluid passage. With such a construction a very sudden increase of velocity of flow might possibly have the effect of causing the valve stem to be pulled over against the eduction port so as to close the same. This undesirable effect could of course be partially overcome by providing a plurality of eduction ports.

One of the objects of my invention is to provide simple means for overcoming this undesirable effect, and insuring that there will always be open communication between the eduction port and the control chamber.

Further objects of the invention will appear hereinafter.

The invention consists in the novel parts and combination of parts to be described hereinafter, all of which contribute to produce an efficient fluid pressure regulator.

A preferred embodiment of the invention is described in the following specification, while the broad scope of the invention is pointed out in the appended claims.

In the drawing:

Fig. 1 is a vertical section through the regulator embodying my invention, and passing on the longitudinal axis of the fluid passage. This view shows portions of the inlet and outlet pipes broken away.

Fig. 2 is a vertical section taken on the line 2—2 of Fig. 1, and further illustrating details of the invention, and particularly the preferred form of the outlet passage. In this view the upper portion of the casing is broken away.

Fig. 3 is a section on the line 3—3 of Fig. 1 passing through the connection between the valve stem and the diaphragm of the pressure chamber.

Fig. 4 is a cross-section on the line 4—4 of Fig. 1, passing through the valve stem and illustrating the preferred form thereof.

When applying my invention to a regulator of a common type involving the use of a valve stem that connects the controlled valve to a control member such as a diaphragm, I provide a construction in the fluid passage that forms an eduction pocket near the valve, past which the fluid flows, and operating in such a way that upon a sudden increase in the velocity of flow, a reduction in pressure will be developed in the eduction pocket, and this reduced pressure will be imparted to the pressure chamber, thereby bringing about a movement of the control member in a direction to move the valve and increase the effective opening at the valve. In accomplishing this I prefer to utilize the already existing guide opening for the valve stem, as a means of communication from the fluid passage to the pressure-control chamber.

Moreover, I believe I am the first to utilize the valve stem guide opening as the means of communication that effects the control of the position of the movable control member or diaphragm that controls the valve position.

Referring more particularly to the parts, 1 indicates a regulator casing connected to an inlet pipe 2 and an outlet pipe 3, and provided with a fluid passage connecting the same, including an inlet passage 4 and an outlet passage 5.

In the regulator illustrated, the interior of the casing is provided with a web 6 that separates the inlet passage 4 from the outlet passage 5, and this web includes a horizontal extension in which the valve opening 7 is provided.

A valve 8 cooperates with this valve opening to control the effective area of opening for the flow of the fluid or gas, and the position of the valve 8 is regulated automatically through the agency of a control chamber. In the present instance, this control chamber 9 is formed as a dished depression on the upper side of the casing, at which point the casing is provided with a flange 10 to enable a cover or bonnet 11 to be secured in place. In this chamber 9, a movable member is provided, preferably in the form of a diaphragm 12, the edge of which is clamped fluid-tight between the flange 10 and a corresponding flange on the bonnet. Between the pressure-control chamber and the fluid passage through the regulator, an integral dividing wall 13 is formed, and through this wall a guide opening 14 is formed for guiding the valve stem 15 that carries the valve 8, the upper end of the said stem being connected to the under side of the diaphragm.

Any suitable means may be provided for effecting this connection, but in the present instance, I have illustrated a type of connection involving the use of a downwardly offset socket plate 16 having a key-hole form opening therein (see Fig. 3) including a substantially circular opening 17 with a slot 18 extending toward the center of the diaphragm. The upper end of the stem is formed with a notch on each side, so that a reduced neck 19 is formed that will ride into the slot 18. This connection, however, is not an accurate connection, but permits considerable play or lost motion between the neck 19 and the side edges of the slot 18. This prevents the diaphragm from exerting any influence on the centering of the stem 15, and enables the guide opening 14 to operate as a guide for the free stem, the stem being merely pushed up or pulled down by the diaphragm in accordance with the pressure exerted in the chamber 9.

The socket plate 16 is preferably secured to the diaphragm through the agency of a pair of diametrically disposed rivets 20, the upper ends of which secure a spring plate 21 in position. This spring plate has an upwardly projecting central boss 22 that receives and centers the lower end of a coil spring 23 that is carried in, and guided by, the bonnet 11.

The space or chamber 24 above the diaphragm, should be vented to the atmosphere, or to a control chamber through a pipe connection 25.

In applying my invention to a regulator having the construction described above, I utilize the valve stem guide opening 14 to perform the function of effecting communication between the fluid passage of the valve and the control chamber 9. In order to accomplish this in the present instance, I provide an eduction port 26 that is preferably drilled by means of a drill applied through the tapped opening through the outlet pipe 3. This eduction port is located on the side of the valve 8 toward the delivery end of the regulator, that is to say, toward the outlet connection 3. By having the eduction port in this location, the gas or other fluid flowing past the eduction port, exerts considerable influence upon the pressure in the eduction port which, of course, is imparted through the guide opening 14 to the pressure chamber 9.

In practice, the eduction port 26 is preferably located in the angle between the dividing wall 13 and a boss 27 that extends downwardly from the under side of the wall, and operates to increase the length of the guide opening.

I prefer to provide a construction at the point where the port 26 emerges into the fluid passage that will form an eduction pocket 28 at this point, and this is preferably accomplished by providing a downwardly projecting baffle or wide tongue 29 that extends across from one side wall 30 of the regulator casing to the other side wall 30 on the opposite side (see Fig. 2). Furthermore, in order to increase the effectiveness of the baffle 29, I prefer to form the regulator casing so that the passage 5 at this point is of substantially rectangular form and relatively elongated in a horizontal direction. In other words, this passage is preferably of rectangular form as indicated in Fig. 2.

The baffle or tongue 29 preferably extends in an inclined direction, inclining downwardly toward the valve and projecting in the direction of the outlet connection 3. By this means a somewhat constricted throat or slot 31 is formed between the upper face of the web 6 at this point, and the lower edge of the baffle. Hence changes in the velocity of flow at this point will have an immediate effect on the static pressure in the pocket 28, which is a desirable condition for attaining a nice regulation of the flow.

In assembling the parts, of course, the valve 8 should be inserted from below, for which purpose an access opening with removable threaded plug 32 is provided on the under side of the valve casing.

With a construction such as described, I anticipate that there might be a tendency when a very sudden increase in velocity of flow occurs, for the increased eduction effect or suction in the port 26 to cause the valve stem 15 to be pressed over against the mouth of the port 26 on the face of the valve stem guide opening 14. In order to overcome any such effect, I prefer to provide the valve stem 15 in the vicinity of this part, with a plurality of horizontal grooves 33 and a plurality of longitudinal grooves 34. The longitudinal grooves 34 extend up to a point above the upper face of the dividing wall 13 in any possible valve position. The circumferential ports 33 insure that ample effective area of communication will be maintained.

Many other embodiments of this invention may be resorted to without departing from the spirit of the invention.

What I claim is:

1. In a fluid pressure regulator, the combination of a casing having a fluid passage therethrough for the fluid and having a pressure control chamber with a wall separating the same from said passage, a movable member in the pressure chamber, controlled by the pressure therein, a valve in said passage, said wall having a guide opening therethrough, a valve stem passing loosely through said guide opening with clearance around the same and connecting the movable member with the valve, said casing having an eduction port formed in, and confined to, the said wall, extending off from the guide opening in a downward direction and emerging into the fluid passage on the face of said wall, and only toward its outlet side, said parts cooperating so that changes in velocity of flow of the fluid control the degree of opening of the valve.

2. In a fluid pressure regulator, the combination of a casing having a fluid passage therethrough for the fluid and having a pressure control chamber with a wall separating the same from said passage, a movable member in the pressure chamber, controlled by the pressure therein, a valve in said passage, said wall having a guide opening therethrough, a stem passing loosely through said guide opening with clearance around the same and connecting the movable member with the valve, said casing having an eduction port extending off from the guide opening and emerging into the fluid passage toward its outlet side, said casing also having a baffle projecting into said fluid passage and forming an eduction pocket at the point of emergence of said eduction port, said parts cooperating so that changes in velocity of flow of fluid develop changes of pressure in the eduction pocket and thereby control the pressure in the control chamber to regulate the degree of opening of the valve.

3. In a fluid pressure regulator, the combination of a casing having a fluid passage therethrough for the fluid and having a pressure control chamber with a wall separating the same from said passage, a movable member in the pressure chamber, controlled by the pressure therein, a valve in said passage, said wall having a guide opening therethrough, a stem passing loosely through said guide opening with clearance around the same and connecting the movable member with the valve, said casing having an eduction port extending off from the guide opening and emerging into the fluid passage toward its outlet side, said ports cooperating so that changes in the velocity of flow of the fluid control the degree of opening of the valve, there being grooves between the face of the stem and the side of the guide opening to insure the maintenance of communication between the eduction port and the pressure chamber.

4. In a fluid pressure regulator, the combination of a casing having a fluid passage therethrough for the fluid and having a pressure control chamber with a wall separating the same from said passage, a movable member in the pressure chamber, controlled by the pressure therein, a valve in said passage, said wall having a guide opening therethrough, a stem passing loosely through said guide opening with clearance around the same and connecting the movable member with the valve, said casing having an eduction port extending off from the guide opening and emerging into the fluid passage toward its outlet side, said casing also having a baffle projecting into said fluid passage and forming an eduction pocket at the point of emergence of said eduction port, said parts cooperating so that changes in velocity of flow of fluid develop changes of pressure in the eduction pocket and thereby control the pressure in the control chamber to regulate the degree of opening of the valve, said valve stem having grooves on the surface thereof to insure the maintenance of communication of the eduction port with the pressure-control chamber in any position the stem may assume in the guide opening.

5. In a fluid pressure regulator, the combination of a casing having a fluid passage therethrough for the fluid and having a pressure-control chamber with a dividing wall separating the same from said passage, a movable member in the pressure chamber controlled by the pressure therein, said casing having a web dividing the fluid passage into an inlet passage and an outlet passage, and having a valve opening therethrough, said dividing wall having a guide opening therethrough, a valve cooperating with said valve opening to regulate the flow through the same and having a valve stem lying in said guide opening connecting to said movable member, with clearance around the stem of said guide opening, a baffle adjacent the dividing wall and projecting downwardly into the outlet passage for the fluid and cooperating with the said dividing web to form an eduction pocket adjacent the guide opening, said casing having an eduction port emerging into the pocket and communicating with the valve opening at the side of the valve stem.

6. In a fluid pressure regulator, the combination of a casing having a fluid passage therethrough for the fluid, and having a pressure-control chamber with a dividing wall separating the same from said passage, a movable member in the pressure chamber controlled by the pressure therein, said casing having a web dividing the fluid passage into an inlet passage, and an outlet passage of substantially rectangular cross-section, and having a valve opening therethrough, said dividing wall having a guide-opening therethrough; a valve cooperating with said valve opening and having a valve stem fitting loosely in said guide-opening connecting to said movable member, a baffle in the form of a transverse bar disposed substantially in an inclined plane inclining toward the valve and in the direction in which the fluid flows in the outlet passage and lying adjacent the dividing wall, said baffle cooperating with the dividing wall to form an eduction pocket adjacent the guide opening, said casing having an eduction port communicating with the interior of the pressure chamber and emerging into said eduction pocket.

EDWIN W. McKINLEY.